Patented Dec. 16, 1952

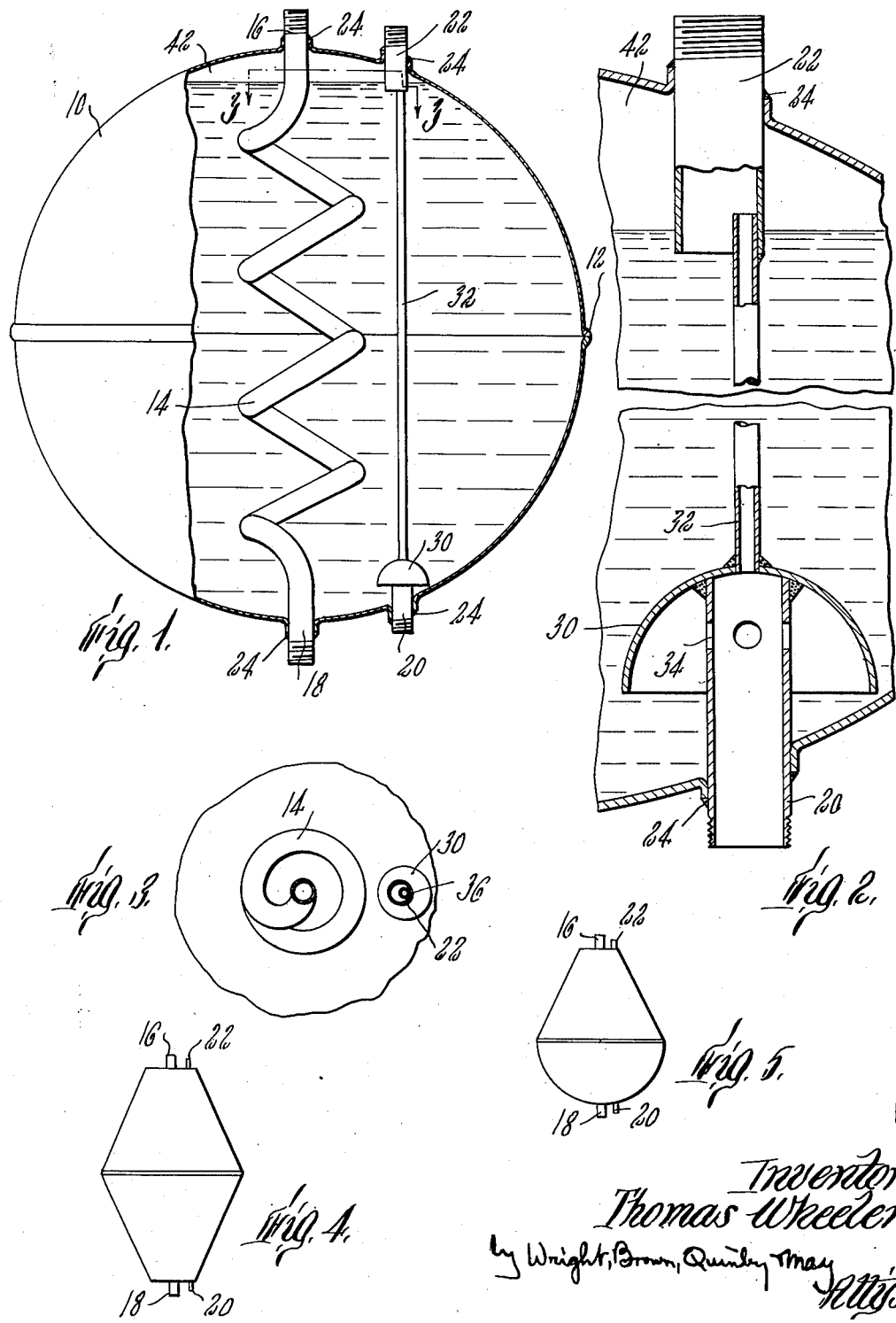

2,621,901

UNITED STATES PATENT OFFICE 2,621,901

APPARATUS FOR HEATING AND STORING WATER

Thomas Wheeler, Milton, Mass.

Application September 29, 1948, Serial No. 51,734

1 Claim. (Cl. 257—205)

This invention relates to improvements in apparatus for heating and storing water, including a closed tank, a heating coil therein, and means for mixing cold water with the hot water drawn from the tank. The invention also relates to an improved method of assembling the parts of the apparatus together.

It is an object of the invention to provide apparatus by which water may be quickly and efficiently heated, a quantity of hot water stored in a compact container, and from which water of a lower temperature may be drawn by the automatic admixture of cold water with the hot water which comes from the container. Thus, for example, for household use, instead of maintaining a relatively large tank of water at the proper temperature for such use, a smaller tank is employed in which the water is heated to a considerably higher temperature. When water is drawn from the tank, a stream of cold water is automatically fed into the discharge stream of hot water, the mixture being at the proper temperature for household use.

According to the invention, a tank is employed which has a shape such that in the upper half of the tank the horizontal cross-sectional area decreases upward to a minimum at the uppermost point of the tank. In other words, the upper walls of the tank converge upward. The specific shape illustrated on the drawing is a sphere, but other shapes having the stated characteristic can be used. Within the tank, a helical coil of pipe, preferably copper, is mounted so that the axis of the coil is vertical and central in the tank. The coil carries steam or other heating medium from which heat is transferred to the water in the tank. As the water which is surrounded by the turns of the coil becomes heated and expands, it flows upward to the top of the tank and stratifies into hot and cold zones, the hot zone initially having a small volume which increases with an expanding base area as more hot water is added at the top of the coil. The centrally located coil of pipe heats a vertical column of water which rises and is progressively heated as it rises to the top of the tank, displacing the cooler water there and forming a zone of hot water. Since the diameter of the shell at the equator is large compared with that of the helix of the coil, the flow of the displaced water from the top of the tank is increasingly slow as it descends to balance the upward stream in and at the coil. This results in a minimum intermingling of the water in the two streams and a relatively rapid formation of a top zone of hot water which is at or near the maximum temperature.

To replace hot water drawn from the top of the tank, cold water is supplied at the bottom, a cap or bell being provided over the inlet so as to minimize turbulence which might disturb the stratification of the hot and cold water zones. If desired, a small stream of cold water from the inlet may be introduced into the outflowing stream of hot water to reduce the temperature of the discharge stream.

In assembling an apparatus embodying the invention, two identical hemispheres are made of suitable material, each with holes to receive the pipes or fittings and each having an outward flange along its entire edge. The pipes and fittings which are to be parts of the complete structure are assembled loosely with the hemispheres, the latter then being brought together flange to flange. The hemispheres are then permanently secured together by welding or other equivalent process, and the pipes and fittings are afterwards secured to the spherical shell by welding, brazing or the like. The outwardly projecting equatorial flanges of the hemispheres make it possible to weld the two hemispheres together without the use of a backing member, such as is usually employed in welding together pieces of relatively thin metal, especially non-ferrous metal.

For a more complete understanding of the invention, reference may be had to the following description thereof, and to the drawing, of which—

Figure 1 is an elevational view of a tank embodying the invention, a portion being broken away to show interior parts;

Figure 2 is a sectional view, on a larger scale, of a portion of the structure shown in Figure 1;

Figure 3 is a fragmentary, sectional view on the line 3—3 of Figure 1; and

Figures 4 and 5 show two of the many other shapes the tank can have.

The invention may be embodied in a tank, such as the sphere 10 shown in Figure 1, the tank consisting of two identical hemispherical shells, each of which is provided with an outturned flange 12 along the entire edge thereof and with two openings to receive the pipes. These shells are preferably of copper, silicon bronze or other suitable metal. Before the hemispherical shells are secured together, they are assembled with a helical coil 14 of thin metal tubing, each of the ends 16 and 18 of the tubing being thrust through one of the holes in each of the hemispherical shells. A short inlet pipe 20 is thrust through the other hole in the lower shell and an outlet pipe 22 is thrust through the corresponding hole in the upper shell, these pipes being part of a pre-assembled mixer-distributor unit hereinafter described.

The hemispherical shells are then welded together by a carbon arc applied to the equatorial flanges, no backing plate being required. The arc fuses the flanges together to make a strong seam which can be made almost flush with the spherical surface of the tank. If preferred, other methods, such as brazing, can be employed to join the hemispheres. The pipes are then secured to the shell, as at 24, by any suitable method, such as welding.

The mixer-distributor unit consists of the inlet pipe 20, the outlet pipe 22, a hemispherical cap or bell 30 secured by welding or the like over the upper or inner end of the inlet pipe 20, and a small tube 32 which leads from the upper end of the inlet pipe 20 into the outlet pipe 22 in which its upper end is secured. The inlet pipe 20 has a number of apertures 34 within the cap 30 to admit water into the tank, the cap serving to prevent excessive turbulence in the tank from the incoming stream. A small portion of the incoming stream flows through the tube 32 directly into the outlet pipe 22. The lower end of the outlet pipe is preferably a short distance below the level of the topmost interior point of the tank so that an air space 42 is maintained in the top of the tank to serve as a cushion when the outgoing stream through the pipe 22 is suddenly checked.

A coil 14 is centrally arranged in the tank, the helical axis of the coil being vertical and extending from pole to pole of the spherical tank. The upper and lower ends of the tubing which forms the helical coil are adapted to be connected to a source of heating fluid, such as steam or the like, adapted to keep the coil 14 adequately heated. Heat which passes through the walls of the coiled tube is taken up by the water in the tank adjacent to the coils, the heated water flowing upward, mostly within the coil, to the upper portion of the tank. Owing to the shape of the tank, the upper portion of which converges upwardly, the heated water which rises to the top gathers in a pool of highly heated water which does not appreciably mix with the body of colder water below, the hot and cold water in the tank remaining substantially stratified, since the antiturbulence bell 30 prevents the formation of any appreciable currents within the tank which would tend to mix the hot and cold water therein. Instead of the spherical shape described, the tank may have other shapes consistent with the requirement that the walls of the upper half converge upwardly. Two such shapes are shown in Figures 4 and 5, and it is evident that many other variations can be had.

The tank is intended for use with an efficient heat supply which will heat the water at the top of the tank to a temperature considerably above that which is desirable for domestic use. The pipe 32 from the cold water inlet 20 is, therefore, employed to bleed a small stream of cold water from the supply stream and to add it to the outgoing stream of hot water which is drawn through the discharge pipe 22. This results in a stream of water which is approximately at the desired temperature for domestic use.

I claim:

A closed tank, means for heating water in said tank, an inlet pipe projecting into said tank near the bottom thereof, a hemispherical cap secured on the upper end of said inlet pipe, said inlet pipe having lateral openings near the upper end thereof to admit water into the tank within said cap, an outlet pipe extending a short distance into the tank through the top thereof, and a small bleeder pipe extending at its lower end through said cap and opening into said inlet pipe, the upper end of said bleeder pipe being secured within said outlet pipe.

THOMAS WHEELER.

REFERENCES CITED

The following references are of record in the file of this patent:

UNITED STATES PATENTS

| Number | Name | Date |
|---|---|---|
| 657,521 | Davie | Sept. 11, 1900 |
| 1,068,742 | Dahl | July 29, 1913 |
| 1,779,165 | Hallett | Oct. 21, 1930 |
| 2,066,190 | Swars | Dec. 29, 1936 |
| 2,067,495 | Long | Jan. 12, 1937 |
| 2,073,236 | Wild et al. | Mar. 9, 1937 |